(12) United States Patent
Ueda

(10) Patent No.: US 7,964,323 B2
(45) Date of Patent: Jun. 21, 2011

(54) DIRECT OXIDATION FUEL CELL

(75) Inventor: Hideyuki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 108 days.

(21) Appl. No.: 12/103,796

(22) Filed: Apr. 16, 2008

(65) Prior Publication Data
US 2008/0261103 A1    Oct. 23, 2008

(30) Foreign Application Priority Data

Apr. 17, 2007  (JP) .................... 2007-108490

(51) Int. Cl.
*H01M 4/02*  (2006.01)
*H01M 8/10*  (2006.01)

(52) U.S. Cl. ............... 429/523; 429/483; 429/479

(58) Field of Classification Search .......... 429/479–481, 429/483, 523–534
See application file for complete search history.

(56) References Cited

U.S. PATENT DOCUMENTS

| | | | |
|---|---|---|---|
| 5,441,822 A * | 8/1995 | Yamashita et al. | 429/34 |
| 6,890,679 B2 * | 5/2005 | Johnsen et al. | 429/40 |
| 2004/0058227 A1 * | 3/2004 | Tanaka et al. | 429/44 |
| 2005/0271930 A1 * | 12/2005 | Egawa | 429/42 |
| 2007/0122684 A1 * | 5/2007 | Song | 429/40 |
| 2007/0238007 A1 * | 10/2007 | Katagiri et al. | 429/40 |
| 2008/0206616 A1 * | 8/2008 | Atanassova et al. | 429/30 |

FOREIGN PATENT DOCUMENTS

| | | |
|---|---|---|
| JP | 8-162123 | 6/1996 |
| JP | 2005-183368 | 7/2005 |
| JP | 2005-197195 | 7/2005 |

* cited by examiner

*Primary Examiner* — Dah-Wei D Yuan
*Assistant Examiner* — Edu E Enin-Okut
(74) *Attorney, Agent, or Firm* — McDermott Will & Emery LLP

(57) ABSTRACT

A direct oxidation fuel cell of this invention has at least one unit cell including: a membrane-electrode assembly including an electrolyte membrane sandwiched between an anode and a cathode, each of the anode and the cathode including a catalyst layer and a diffusion layer; an anode-side separator with a fuel flow channel for supplying a fuel to the anode; and a cathode-side separator with an oxidant flow channel for supplying an oxidant to the cathode. The catalyst layer of at least one of the anode and the cathode includes high-porosity regions and low-porosity regions, and the high-porosity regions and the low-porosity regions are arranged in a mixed configuration.

3 Claims, 4 Drawing Sheets

F I G. 3
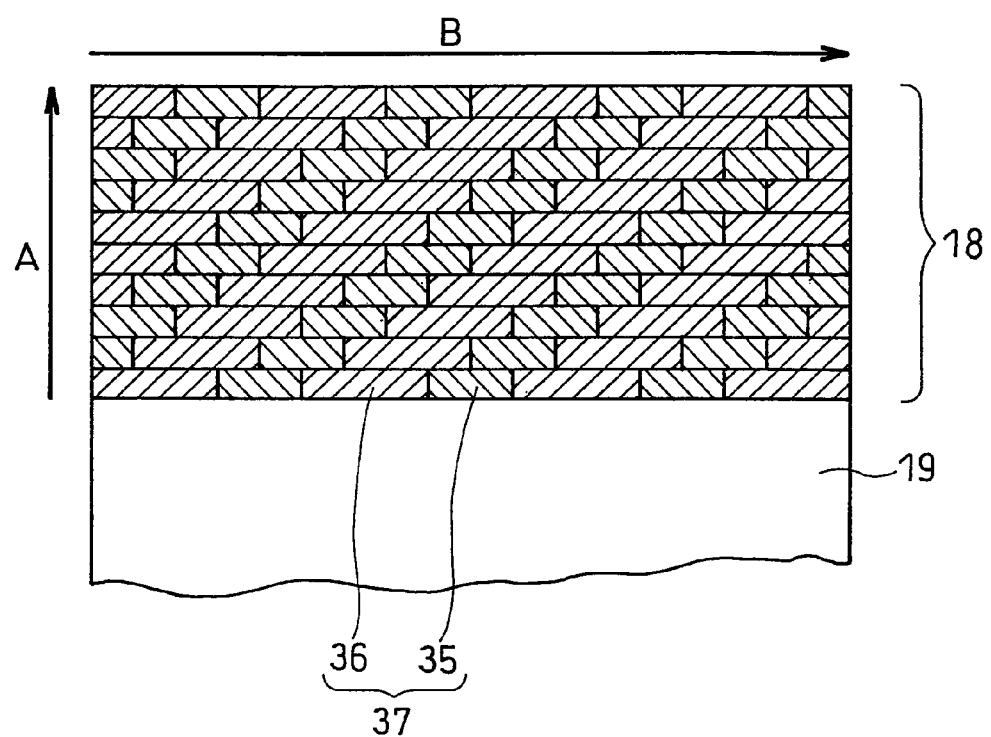

DIRECT OXIDATION FUEL CELL

FIELD OF THE INVENTION

The invention relates to direct oxidation fuel cells, which directly use a fuel without reforming it into hydrogen. More particularly, the invention relates to improvements in the electrode for a direct oxidation fuel cell.

BACKGROUND OF THE INVENTION

With the advancement of ubiquitous network society, there is a large demand for mobile devices such as cellular phones, notebook personal computers, and digital still cameras. As the power source for mobile devices, it is desired to put fuel cells, which do not have to be recharged and can continuously supply power to devices if get refueled, into practical use as early as possible.

Among fuel cells, direct oxidation fuel cells, which generate power by directly supplying an organic fuel such as methanol or dimethyl ether to an anode for oxidation without reforming it into hydrogen, are actively studied and developed. Direct oxidation fuel cells are receiving attention in terms of the high theoretical energy densities of organic fuels, system simplification, ease of fuel storage, etc.

A direct oxidation fuel cell has a unit cell composed of a membrane-electrode assembly (MEA) sandwiched between separators. The MEA is composed of a solid polymer electrolyte membrane sandwiched between an anode and a cathode, and each of the anode and the cathode includes a catalyst layer and a diffusion layer. Such a direct oxidation fuel cell generates power by supplying a fuel and water to the anode and supplying an oxidant to the cathode.

For example, the electrode reactions of a direct methanol fuel cell (hereinafter referred to as a "DMFC"), which uses methanol as the fuel, are as follows.

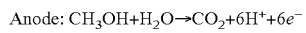

Anode: $CH_3OH + H_2O \rightarrow CO_2 + 6H^+ + 6e^-$

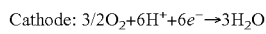

Cathode: $3/2 O_2 + 6H^+ + 6e^- \rightarrow 3H_2O$

On the anode, methanol reacts with water to produce carbon dioxide, protons, and electrons. The protons produced on the anode migrate to the cathode through the electrolyte membrane, and the electrons migrate to the cathode through an external circuit. On the cathode, these protons and electrons combine with oxygen to form water.

However, practical utilization of DMFCs has some problems.

The anode of DMFCs has a low catalytic activity (specific activity) to oxidize methanol. Hence, the anode overvoltage of DMFCs is markedly high compared with that of solid polymer electrolyte fuel cells (hereinafter referred to as PEFCs) which use hydrogen as the fuel. Further, due to the so-called "methanol crossover", i.e., permeation of unreacted methanol through the electrolyte membrane to the cathode, methanol oxidation reaction occurs on the cathode in addition to oxygen reduction reaction (cathode electrode reaction). The methanol oxidation reaction causes an increase in cathode overvoltage. For these two reasons, the overvoltage of DMFCs is increased, so that the power density of DMFCs is lower than that of PEFCs.

To address these problems, there has been proposed a method of increasing the amount of catalysts included in a DMFC relative to a PEFC to increase the surface area of the catalysts per unit electrode area. However, an increase in the amount of a catalyst leads to an increase in the thickness of the catalyst layer itself, so that it becomes difficult for methanol or air (oxygen) to reach the reaction site inside the catalyst layer. As a result, the power generating characteristics degrade. When the pore size of the catalyst layer is enlarged to avoid such a problem, the electronic conductivity and proton conductivity lower significantly.

Hence, in order to solve the above-discussed problems, many proposals have been made to improve the structure of the catalyst layers themselves.

For example, Japanese Laid-Open Patent Publication No. 2005-183368 (Document 1) discloses that each of the anode catalyst layer and the cathode catalyst layer has a thickness of 20 μm or more, that at least one of the catalyst layers has pores with pore sizes of 0.3 to 2.0 μm, and that the volume of these pores is equal to or greater than 4% of the volume of all the pores. With such configuration, Document 1 intends to facilitate the supply of liquid fuel and air (oxygen) to respective reaction sites inside the electrodes without lowering electronic conductivity and proton conductivity.

Japanese Laid-Open Patent Publication No. 2005-197195 (Document 2), which is not directed to a DMFC, discloses that at least one of the catalyst layers has a laminate structure composed of a layer with pores for promoting gas supply ("porous layer") and a layer without such pores ("non-porous layer"), and that the porous layer is disposed on the gas diffusion layer side. With such configuration, Document 2 intends to efficiently supply reactant gas to the catalyst contained in the catalyst layer and suppress an increase in the electron transfer resistance of the catalyst layer.

Japanese Laid-Open Patent Publication No. Hei 8-162123 (Document 3), which is not directed to a DMFC either, discloses that the size of clusters of catalyst particles and ion-exchange resin is small on the polymer electrolyte membrane side and large on the current collector side. With such configuration, Document 3 intends to facilitate the supply of reactant gas and the removal of generated gas and increase the utilization rate of the catalyst.

However, according to such conventional configurations, it is difficult to obtain a catalyst layer with a small overvoltage in which electronic conductivity and proton conductivity are ensured and the diffusion of fuel or air and the removal of carbon dioxide or water (reaction product) are improved.

In the case of the technique represented by Document 1, the lower limit value of thickness of the catalyst layer, the pore size, and the pore volume are merely specified, and it is difficult to say that the whole catalyst layer has an optimum pore structure that is excellent in all of the diffusion of fuel or air, the removal of carbon dioxide or water (reaction product), electronic conductivity, and proton conductivity.

In the case of the technique represented by Document 2, the catalyst layer has a laminate structure of two or more layers; the porous layer on the gas diffusion layer side is provided with the function of diffusing fuel or air and removing carbon dioxide or water produced, while the non-porous layer on the polymer electrolyte membrane side is provided with the function of electron conductivity. However, since actual electrode reaction takes place in the three-phase interface of catalyst/electrolyte/reactant gas (fuel or air), this configuration may have the problem of degradation of power generating characteristics due to insufficient distribution paths of reactant gas in the non-porous layer on the polymer electrolyte membrane side.

In the case of the technique represented by Document 3, the catalyst layer near the polymer electrolyte membrane is characterized as the main site of electrode reaction, and the catalyst layer near the current collector is characterized as the site where the supply of reactant gas and the removal of generated gas are facilitated. However, in the same manner as in Document 2, the functions of the catalyst layer are allocated only in the thickness direction of the catalyst layer. It is thus difficult to secure a three-phase interface where electrode reaction takes place, and the power generating characteristics at high current densities degrade.

The invention solves these problems associated with conventional art, and intends to provide a direct oxidation fuel cell that is excellent in power generating characteristics and durability.

BRIEF SUMMARY OF THE INVENTION

A direct oxidation fuel cell of the invention has at least one unit cell including: a membrane-electrode assembly comprising an electrolyte membrane sandwiched between an anode and a cathode, each of the anode and the cathode including a catalyst layer and a diffusion layer; an anode-side separator with a fuel flow channel for supplying a fuel to the anode; and a cathode-side separator with an oxidant flow channel for supplying an oxidant to the cathode. The catalyst layer of at least one of the anode and the cathode includes high-porosity regions and low-porosity regions, and the high-porosity regions and the low-porosity regions are arranged in a mixed configuration.

Preferably, the high-porosity regions and the low-porosity regions are mixed regularly or irregularly in a thickness direction of the catalyst layer and a direction perpendicular to the thickness direction.

The catalyst layer of at least one of the anode and the cathode is preferably a group of units each including at least one of the high-porosity regions and at least one of the low-porosity regions.

Preferably, the units are arranged regularly or irregularly in a thickness direction of the catalyst layer and a direction perpendicular to the thickness direction.

It is preferable that the high-porosity regions have a porosity of 86 to 95%, and that the low-porosity regions have a porosity of 65 to 85%.

The difference between the porosity of the high-porosity regions and the porosity of the low-porosity regions is preferably equal to or greater than 10%.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is a schematic longitudinal sectional view of the structure of a cathode catalyst layer included in a fuel cell according to another embodiment of the invention.

DETAIL DESCRIPTION OF THE INVENTION

A direct oxidation fuel cell of the invention has at least one unit cell including: a membrane-electrode assembly including an electrolyte membrane sandwiched between an anode and a cathode; an anode-side separator in contact with the anode; and a cathode-side separator in contact with the cathode. Each of the anode and the cathode includes a catalyst layer and a diffusion layer. The face of the anode-side separator in contact with the anode has a fuel flow channel for supplying a fuel to the anode. The face of the cathode-side separator in contact with the cathode has an oxidant flow channel for supplying an oxidant to the cathode.

The catalyst layer of at least one of the anode and the cathode includes high-porosity regions and low-porosity regions, and the high-porosity regions and the low-porosity regions are mixed in the catalyst layer.

The high-porosity regions and the low-porosity regions may be arranged regularly or irregularly as long as they are mixed in the catalyst layer.

Figure 1:
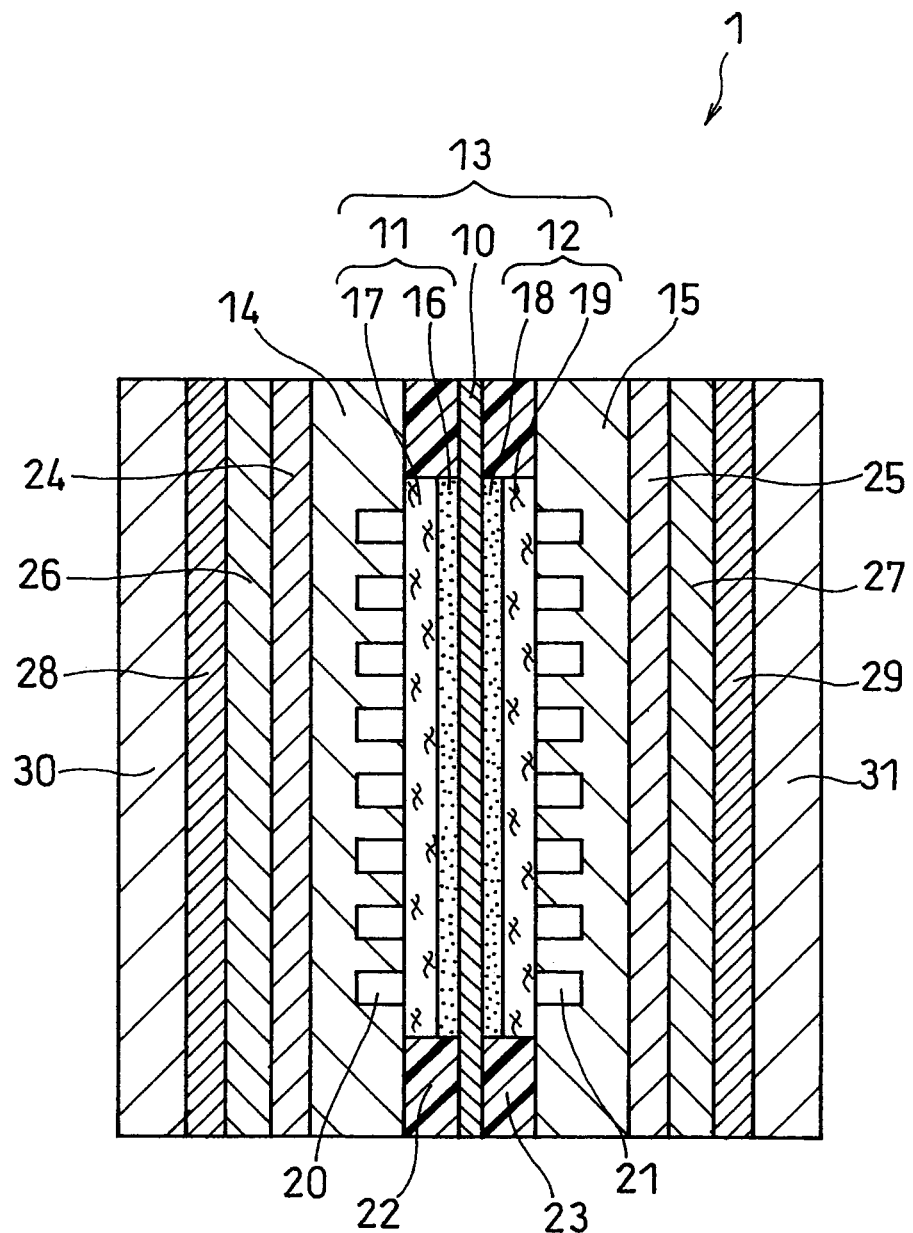
FIG. 1 is a schematic longitudinal sectional view of a unit cell included in a fuel cell according to one embodiment of the invention.

FIG. 1 is a longitudinal sectional view of a unit cell 1 included in a fuel cell according to one embodiment of the invention. The unit cell 1 in FIG. 1 includes a membrane-electrode assembly (MEA) 13 composed of an electrolyte membrane 10 and an anode 11 and a cathode 12 sandwiching the electrolyte membrane 10, and an anode-side separator 14 and a cathode-side separator 15 sandwiching the MEA 13.

The anode 11 includes an anode catalyst layer 16 in contact with the electrolyte membrane 10 and an anode diffusion layer 17 facing the anode-side separator 14. The cathode 12 includes a cathode catalyst layer 18 in contact with the electrolyte membrane 10 and a cathode diffusion layer 19 facing the cathode-side separator 15.

The anode-side separator 14 has, on the face opposing the anode 11, a flow channel 20 for supplying a fuel and discharging unused fuel and reaction product. The cathode-side separator 15 has, on the face opposing the cathode 12, a flow channel 21 for supplying an oxidant and discharging unused oxidant and reaction product.

Around the anode 11 and the cathode 12, gaskets 22 and 23 are disposed, respectively, so as to sandwich the electrolyte membrane 10, in order to prevent leakage of the fuel, oxidant, and reaction products. Further, in the unit cell 1 of FIG. 1, the separators 14 and 15 are sandwiched between current collector plates 24 and 25, sheet heaters 26 and 27, insulator plates 28 and 29, and end plates 30 and 31, respectively. The unit cell 1 is secured by clamping means (not shown).

The electrolyte membrane 10 is preferably excellent in proton conductivity, heat resistance, chemical stability, etc. As long as the electrolyte membrane 10 has these characteristics, the material (polymer electrolyte) of the electrolyte membrane 10 is not particularly limited.

Each of the anode catalyst layer 16 and the cathode catalyst layer 18 is a thin film with a thickness of approximately 10 to 100 μm, composed mainly of a polymer electrolyte and conductive carbon particles carrying catalyst metal fine particles or catalyst metal fine particles. The catalyst metal of the anode catalyst layer 16 can be, for example, a platinum (Pt)-ruthenium (Ru) alloy in the form of fine particles. The catalyst metal of the cathode catalyst layer 18 can be, for example, Pt in the form of fine particles. The polymer electrolyte contained in each catalyst layer is preferably the same as the material of the electrolyte membrane 10.

Figure 2:
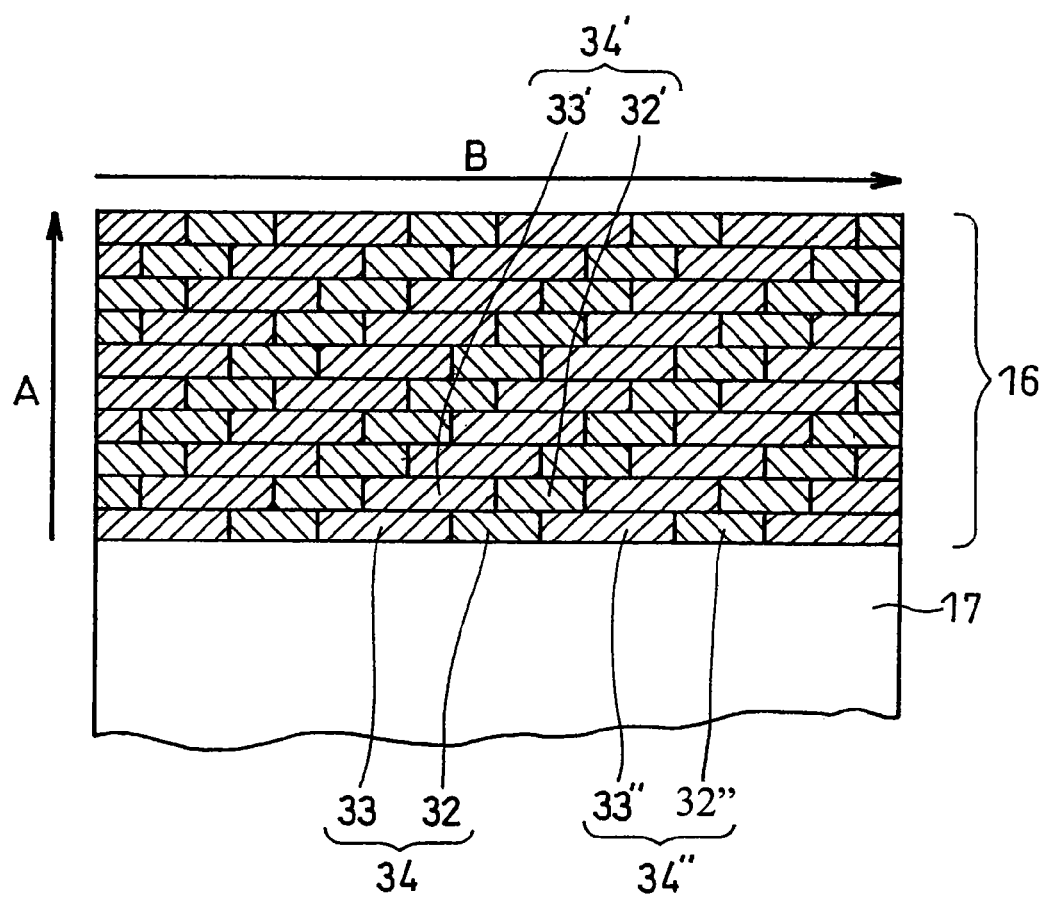
FIG. 2 is a schematic longitudinal sectional view of the structure of an anode catalyst layer included in a fuel cell according to one embodiment of the invention.

FIG. 2 and FIG. 3 illustrate an anode catalyst layer and a cathode catalyst layer, respectively, in which high-porosity regions and low-porosity regions are regularly arranged.

As illustrated in FIG. 2, in the anode catalyst layer 16, high-porosity regions 32 and low-porosity regions 33 are mixed in the thickness direction (the direction parallel to the arrow A) and the direction perpendicular to the thickness direction (e.g., the direction parallel to the arrow B). In FIG.

2, the anode catalyst layer 16 is a group of units 34 each composed of one high-porosity region 32 and one low-porosity region 33. In the anode catalyst layer 16, the units 34 are arranged regularly in the thickness direction and the direction perpendicular to the thickness direction.

In the direction from the side of the anode catalyst layer 16 in contact with the anode diffusion layer 17 toward the side in contact with the electrolyte membrane (the direction of the arrow A), the predetermined unit 34 and an adjacent unit 34' are so arranged that the position of the unit 34' is slightly shifted from the position of the unit 34 in the direction of the arrow B.

In the direction parallel to the arrow B, the predetermined unit 34 and an adjacent unit 34" are so arranged that the high-porosity region 32 of the unit 34 and a low-porosity region 33" of the adjacent unit 34" are in contact with each other. That is, in the direction parallel to the arrow B, the high-porosity regions and the low-porosity regions are alternately arranged.

The high-porosity region 32 is a region having high diffusibility of fuel and reaction product but having low conductivity of electrons and protons, whereas the low-porosity region 33 is a region having low diffusibility of fuel and reaction product but having high conductivity of electrons and protons.

As illustrated in FIG. 3, in the cathode catalyst layer 18, high-porosity regions 35 and low-porosity regions 36 are also mixed. The cathode catalyst layer 18 of FIG. 3 is also a group of units 37 each composed of one high-porosity region 35 and one low-porosity region 36 in the same manner as the anode catalyst layer of FIG. 2. The units 37 are arranged in the thickness direction of the cathode catalyst layer and the direction perpendicular to the thickness direction in the same manner as in FIG. 2.

As in the anode, the high-porosity region 35 is a region having high diffusibility of oxidant and reaction product but having low conductivity of electrons and protons, whereas the low-porosity region 36 is a region having low diffusibility of oxidant and reaction product but having high conductivity of electrons and protons.

As described above, according to the invention, the high-porosity regions and the low-porosity regions, which have two mutually conflicting functions that the catalyst layer is required to have, are three-dimensionally mixed throughout the catalyst layer. That is, the regions having paths effective for dispersing the fuel or oxidant and removing carbon dioxide or water (reaction product) and the regions having good electron and proton conductivity are mixed throughout the catalyst layer. This makes it possible to enlarge the three-phase interface where electrode reaction takes place and obtain a catalyst layer with a small overvoltage. Therefore, the invention can provide a direct oxidation fuel cell that is excellent in power generating characteristics and durability.

As described above, in the invention, the arrangement of the high-porosity regions and the low-porosity regions in the catalyst layer may be regular or irregular. Preferably, the high-porosity regions and the low-porosity regions are arranged regularly or irregularly in the thickness direction of the catalyst layer and the direction perpendicular to the thickness direction. This makes it possible to enhance the evenness of electrode reaction in the whole area of the catalyst layer and significantly suppress deterioration of the catalyst layer.

Further, as illustrated in FIGS. 2 and 3, the catalyst layer is preferably a group of units each including at least one high-porosity region and at least one low-porosity region, and the units are preferably arranged regularly or irregularly in the thickness direction of the catalyst layer and the direction perpendicular to the thickness direction. This configuration allows the high-porosity regions and the low-porosity regions to be arranged more evenly in the catalyst layer, thereby further enhancing the evenness of electrode reaction in the whole area of the catalyst layer.

When the catalyst layer is a group of the above-mentioned units, the adjacent units may be misaligned in the direction parallel to the thickness direction of the catalyst layer (arrow A), or may be misaligned in the direction parallel to the plane direction perpendicular to the thickness direction (arrow B). Also, in the surface of the catalyst layer in the direction perpendicular to the thickness direction, the units may be aligned in a row in the direction of the arrow B.

Both the anode catalyst layer and the cathode catalyst layer may be composed of the high-porosity regions and the low-porosity regions, or one of the anode catalyst layer and the cathode catalyst layer may be composed of the high-porosity regions and the low-porosity regions.

When both the anode catalyst layer and the cathode catalyst layer have the high-porosity regions and the low-porosity regions, the arrangement of the two regions in the anode catalyst layer and the arrangement of the two regions in the cathode catalyst layer may be the same or different.

The porosity of the high-porosity regions of the catalyst layer is preferably 86 to 95%, and more preferably 88 to 93%. The porosity of the low-porosity regions is preferably 65 to 85%, and more preferably 68 to 82%. In this case, the difference between the porosity of the high-porosity regions and the porosity of the low-porosity regions is preferably 10% or more, and more preferably 15% or more.

By adjusting the porosity of each region in the above-mentioned range, the catalyst layer can have an optimum pore structure in which the high-porosity regions and the low-porosity regions are three-dimensionally mixed.

If the porosity of the high-porosity regions exceeds 95%, the electronic conductivity and proton conductivity of these regions may lower. If the porosity of the high-porosity regions is less than 86%, the diffusion of fuel or oxidant and the removal of reaction product such as carbon dioxide or water may be impaired.

If the porosity of the low-porosity regions is less than 65%, the diffusion of fuel or oxidant and the removal of reaction product may be impaired in these regions. If the porosity of the low-porosity regions is greater than 85%, the electronic conductivity and proton conductivity may lower.

If the difference between the porosity of the high-porosity regions and the porosity of the low-porosity regions is less than 10%, the whole area of the catalyst layer can be regarded as having a uniform structure in which the porosity difference is small. Hence, the electronic conductivity and proton conductivity may lower, or the diffusion of fuel or oxidant and the removal of reaction product may be impaired. In this case, it is difficult to secure a three-phase interface where electrode reaction takes place.

The high-porosity regions and the low-porosity regions in the catalyst layer can be distinguished, for example, by observing a cross-section of the catalyst layer with a scanning electron microscope (SEM). The porosities of the high-porosity regions and the low-porosity regions can be determined, for example, from pore distribution obtained by mercury intrusion.

The porosity can also be determined as follows. Under the same production conditions as those for the high-porosity regions and low-porosity regions of the catalyst layer, a layer composed only of a high-porosity region and a layer composed only of a low-porosity region are prepared. By measuring the porosity of each of the layers obtained, the porosities of the high-porosity region and the low-porosity region can be obtained. The porosity of each of the layers is determined by measuring the pore distribution in each layer by mercury intrusion and obtaining data.

The largest dimension of the high-porosity regions in the thickness direction of the catalyst layer is preferably 1 to 10 μm. The largest dimension of the high-porosity regions in the plane direction of the catalyst layer perpendicular to the thickness direction is preferably 5 to 20 mm.

The largest dimension of the low-porosity regions in the thickness direction of the catalyst layer is preferably 1 to 10 μm. The largest dimension of the low-porosity regions in the plane direction of the catalyst layer perpendicular to the thickness direction is preferably 5 to 20 mm.

The largest dimensions of the high-porosity regions in the thickness direction of the catalyst layer and the plane direction of the catalyst layer perpendicular to the thickness direction and the largest dimensions of the low-porosity regions in the thickness direction of the catalyst layer and the plane direction of the catalyst layer perpendicular to the thickness direction can be determined, for example, by observing a predetermined cross-section of the catalyst layer with an electron microscope.

When at least one of the anode catalyst layer and the cathode catalyst layer includes the high-porosity regions and the low-porosity regions, the largest pore size in the whole catalyst layer is preferably 1 to 30 μm, or 5 to 20 μm.

The pore size can be determined, for example, by observing a predetermined cross-section of the catalyst layer with an electron microscope and measuring pore distribution by mercury intrusion.

When the catalyst layer is divided into two portions on the electrolyte membrane side and the diffusion layer side in the thickness direction, the average porosity of the portion on the electrolyte membrane side may be made lower than that of the portion on the diffusion layer side. In this case, the conductivity of protons and the like and the removal of reaction product can be further improved. The average porosity of each of the portion on the electrolyte membrane side and the portion on the diffusion layer side can be controlled by adjusting the ratio of the high-porosity regions to the low-porosity regions in that portion.

The ratio of the pore volume of the high-porosity regions to the pore volume of the low-porosity regions is preferably from 2:1 to 1:2.

The pore volume ratio can be obtained, for example, by measuring pore distribution by mercury intrusion, calculating, from the result thereof, the pore volume of the high-porosity regions and the pore volume of the low-porosity regions, and obtaining the ratio therebetween.

The anode diffusion layer 17 can be a conductive porous substrate which allows fuel to be diffused and carbon dioxide produced by power generation to be removed therethrough while having electronic conductivity. Examples of such conductive porous substrates include carbon paper and carbon cloth. Also, based on a known technique, such a conductive porous substrate may be subjected to a water-repellent treatment. Further, the surface of the conductive porous substrate on the anode catalyst layer 16 side may be provided with a water-repellent carbon layer (not shown).

The cathode diffusion layer 19 can be a conductive porous substrate which allows oxidant to be diffused and water produced by power generation to be removed therethrough while having electronic conductivity. Examples of such conductive porous substrates include carbon paper and carbon cloth. Also, based on a known technique, such a conductive porous substrate may be subjected to a water-repellent treatment.

Further, the surface of the conductive porous substrate on the cathode catalyst layer 18 side may be provided with a water-repellent carbon layer (not shown).

The material of the separators 14 and 15 is not particularly limited if it has gas tightness, electronic conductivity, and electrochemical stability. Also, the shape of the flow channels 20 and 21 is not particularly limited either.

With respect to the material of the current collector plates 24 and 25, sheet heaters 26 and 27, insulator plates 28 and 29, and end plates 30 and 31, any materials known in the art can be used.

Figure 4:
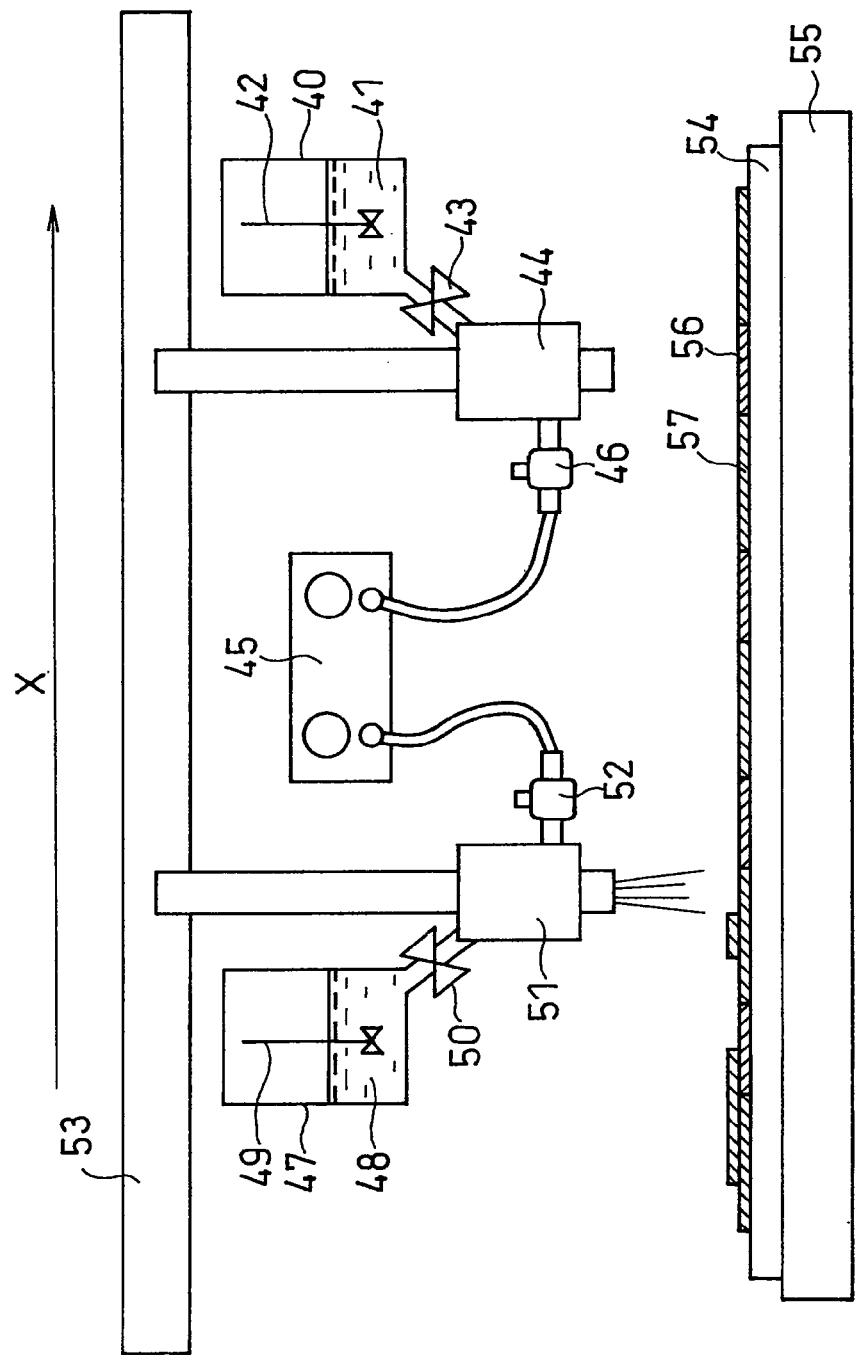
FIG. 4 is a schematic view of the structure of a spray coater used to form a catalyst layer.

Next, with reference to FIG. 4, a method for forming a catalyst layer including high-porosity regions and low-porosity regions is described. FIG. 4 is a schematic view of the structure of a spray coater for forming such a catalyst layer.

Such a catalyst layer can be formed by a method including, for example, the steps of:

(a) preparing a first catalyst ink for forming high-porosity regions;

(b) preparing a second catalyst ink for forming low-porosity regions; and (c) applying the first catalyst ink and the second catalyst ink onto a predetermined substrate in a predetermined pattern and drying them.

A tank 40 of a spray coater contains a first catalyst ink 41 for forming high-porosity regions. The first catalyst ink 41 is constantly stirred by means of a stirring device 42 and fed to a spray gun 44 through an open/close valve 43. The first catalyst ink 41 is forced out of the spray gun 44 together with a jet of gas. The jet gas is fed through a gas pressure adjustor 45 and a gas flow rate adjustor 46 to the spray gun 44.

A tank 47 contains a second catalyst ink 48 for forming low-porosity regions. The second catalyst ink 48 is constantly stirred by means of a stirring device 49, and fed to a spray gun 51 through an open/close valve 50. The second catalyst ink 48 is forced out of the spray gun 51 together with a jet of gas. The jet gas is fed through the gas pressure adjustor 45 and a gas flow rate adjustor 52 to the spray gun 51.

The jet gas can be, for example, nitrogen gas.

In the apparatus of FIG. 4, the spray guns 44 and 51 are coupled to an actuator 53 and are capable of moving in two directions of X axis parallel to arrow X and Y axis perpendicular to X axis from a given position at a give speed. Thus, the arrangement of high-porosity regions 56 and low-porosity regions 57 can be freely changed.

The spray guns 44 and 51 are installed above a substrate 54 such as a polymer film. They are capable of moving while spraying the catalyst inks 41 and 48, so that a catalyst layer including regions of different porosities can be formed on the substrate 54. At this time, it is preferable that the surface temperature of the substrate 54 during the formation of the catalyst layer be controlled by a heater 55.

It is noted that FIG. 4 illustrates a process of forming the low-porosity regions 57 in which the catalyst ink 48 is sprayed from the spray gun 51 and the spray gun 44 is not working.

The porosity of the high-porosity regions and the porosity of the low-porosity regions can be controlled, for example, by applying or not applying an ultrasonic treatment to the catalyst ink immediately before spraying it, and adjusting the pressure and flow rate of the jet gas and the surface temperature of the substrate. For example, the surface temperature of the substrate is preferably 45 to 65° C.

The pressure of the jet gas for spraying the first catalyst ink is preferably 0.05 to 0.12 MPa, and the pressure of the jet gas for spraying the second catalyst ink is preferably 0.20 to 0.30 MPa, although it depends on the composition, etc. of the catalyst ink.

It is noted that the catalyst inks may be applied by other methods known in the art than spray coating.

EXAMPLES

The invention is hereinafter described in detail by way of Examples, but these Examples are not to be construed as being limiting in any way the invention.

Example 1

Preparation of Anode Catalyst Layer

Fine particles of Pt—Ru alloy (Pt:Ru weight ratio=2:1) with a mean particle size of 3 nm were used as the anode catalyst particles. The anode catalyst particles were ultrasonically dispersed in an aqueous solution of isopropanol, and the resulting dispersion was mixed with an aqueous solution containing 5% by weight of a polymer electrolyte. The resulting mixture was highly dispersed in a bead mill to prepare an anode catalyst ink. The weight ratio of the catalyst particles to the polymer electrolyte in the catalyst ink was set to 2:1. The polymer electrolyte used was perfluorocarbon sulfonic acid ionomer (Flemion available from Asahi Glass Co., Ltd.).

Next, using the spray coater illustrated in FIG. 4, the anode catalyst layer 16 illustrated in FIG. 2 was formed.

The second catalyst ink 48 for forming the low-porosity regions 57 of the anode catalyst layer 16 was prepared by ultrasonically dispersing the above-mentioned anode catalyst ink for 30 minutes immediately before spraying it. Nitrogen gas was used as the jet gas for spraying the catalyst ink, and the pressure of the nitrogen gas was set to 0.20 MPa.

The first catalyst ink 41 for forming the high-porosity regions 56 was prepared by stirring the above-mentioned anode catalyst ink in the tank 40 for 10 minutes without ultrasonically dispersing it immediately before spraying it. The pressure of the nitrogen gas was set to 0.10 MPa.

The anode catalyst layer 16 illustrated in FIG. 2 was prepared by reapplying the first catalyst ink and the second catalyst to form 32 layers in the thickness direction. Specifically, the starting positions of spraying of each catalyst ink, i.e., the starting positions of the high-porosity regions in a predetermined layer and the starting positions of the high-porosity regions in the layer on top of the predetermined layer were laterally shifted by 1 mm (an offset of 1 mm). Also, the first catalyst ink 41 and the second catalyst ink 48 were repeatedly sprayed in turn. The moving speed of the spray guns 44 and 51 for spray coating was set to 20 mm/sec. A polytetrafluoroethylene sheet (Naflon PTFE sheet available from NICHIAS Corporation) was used as the substrate 54, and its surface temperature was set to 55° C.

After the spray coating, the resulting anode catalyst layer sheet was dried in the air at room temperature for 6 hours or more. In this way, the anode catalyst layer was prepared. The thickness of the dried anode catalyst layer was approximately 105 μm.

On the top face of the anode catalyst layer, in the direction of the arrow B, only one row of alternating high-porosity and low-porosity regions were exposed. This holds true for the cathode catalyst layer.

The largest dimension of the high-porosity regions in the thickness direction of the anode catalyst layer was 4 μm, and the largest dimension of these regions in the plane direction perpendicular to the thickness direction was 12 mm. The largest dimension of the low-porosity regions in the thickness direction of the anode catalyst layer was 3 μm, and the largest dimension of these regions in the plane direction perpendicular to the thickness direction was 8 mm. In this Example, the following Examples, and Comparative Examples, the largest dimension of the high-porosity regions in the thickness direction of the anode catalyst layer was in the range of 2 to 6 μm, and the largest dimension of the low-porosity regions in the thickness direction of the anode catalyst layer was in the range of 2 to 4 μm.

In the whole anode catalyst layer, the largest pore size was approximately 10 μm, which held true for the following Examples and Comparative Examples.

In the anode catalyst layer, the ratio of the pore volume of the high-porosity regions to the pore volume of the low-porosity regions was 1:1.

(Preparation of Cathode Catalyst Layer)

Carbon black (conductive carbon particles) with a mean primary particle size of 30 nm (ketjen black EC available from Mitsubishi Chemical Corporation) carrying Pt with a mean particle size of 3 nm was used as the cathode catalyst. The amount of Pt was set to 50% by weight of the total of Pt and carbon black.

The cathode catalyst particles were ultrasonically dispersed in an aqueous solution of isopropanol, and the resulting dispersion was mixed with an aqueous solution containing 5% by weight of a polymer electrolyte. The resulting mixture was highly dispersed in a bead mill to prepare a cathode catalyst ink. The weight ratio of the catalyst particles to the polymer electrolyte in the catalyst ink was set to 3:2. The polymer electrolyte used was perfluorocarbon sulfonic acid ionomer (Flemion available from Asahi Glass Co., Ltd.).

Next, using the spray coater illustrated in FIG. 4, the cathode catalyst layer 18 illustrated in FIG. 3 was formed.

A second catalyst ink 48' for forming low-porosity regions 57' of the cathode catalyst layer was prepared by ultrasonically dispersing the above-mentioned cathode catalyst ink for 30 minutes immediately before spraying it. Nitrogen gas was used as the jet gas for spraying the catalyst ink, and the pressure of the nitrogen gas was set to 0.20 MPa.

A first catalyst ink 41' for forming high-porosity regions 56' was prepared by stirring the above-mentioned cathode catalyst ink in the tank 40 for 10 minutes without ultrasonically dispersing it immediately before spraying it. The pressure of the nitrogen gas was set to 0.10 MPa.

The cathode catalyst layer 18 illustrated in FIG. 3 was prepared by reapplying the first catalyst ink 41' and the second catalyst ink 48' to form 32 layers in the thickness direction. Specifically, the starting positions of spraying of each catalyst ink were laterally shifted by 1 mm (an offset of 1 mm), and the first catalyst ink 41' and the second catalyst ink 48' were repeatedly sprayed in turn. The moving speed of the spray guns 44 and 51 for spray coating was set to 20 mm/sec. A polytetrafluoroethylene sheet (Naflon PTFE sheet available from NICHIAS Corporation) was used as the substrate 54, and its surface temperature was set to 55° C.

After the spray coating, the resulting cathode catalyst layer sheet was dried in the air at room temperature for 6 hours or more. In this way, the cathode catalyst layer was prepared. The thickness of the dried cathode catalyst layer 18 was approximately 65 μm.

The largest dimension of the high-porosity regions in the thickness direction of the cathode catalyst layer was 3 μm, and the largest dimension of these regions in the plane direction perpendicular to the thickness direction was 12 mm. The largest dimension of the low-porosity regions in the thickness direction of the cathode catalyst layer was 2 μm, and the largest dimension of these regions in the plane direction perpendicular to the thickness direction was 8 mm. In this Example, the following Examples, and Comparative Examples, the largest dimension of the high-porosity regions in the thickness direction of the cathode catalyst layer was in the range of 2 to 3 μm, and the largest dimension of the low-porosity regions in the thickness direction of the catalyst layer was in the range of 1 to 2 μm.

In the whole cathode catalyst layer, the largest pore size was approximately 20 μm, which held true for the following Examples and Comparative Examples.

In the cathode catalyst layer, the ratio of the pore volume of the high-porosity regions to the pore volume of the low-porosity regions was 1:1.

(Preparation of Membrane-Electrode Assembly (MEA))

The anode catalyst sheet and the cathode catalyst sheet were cut to a size of 6 cm×6 cm. The cut anode catalyst sheet and the cut cathode catalyst sheet were laminated with an electrolyte membrane interposed therebetween, so that their catalyst layers were positioned inward. The anode catalyst layer, the electrolyte membrane, and the cathode catalyst layer were then thermally bonded together by hot pressing (130° C., 7 MPa, 5 minutes). The electrolyte membrane used was a perfluoroalkyl sulfonic acid ion-exchange membrane (Nafion 112 available from E.I. du Pont de Nemours and Company).

Subsequently, the polytetrafluoroethylene sheet was removed from each of the anode catalyst layer and the cathode catalyst layer, to obtain a catalyst coated membrane assembly (CCM). In the CCM, the content of the Pt—Ru catalyst in the anode catalyst layer was 5.6 mg/cm$^2$, and the content of the Pt catalyst in the cathode catalyst layer was 1.3 mg/cm$^2$.

Thereafter, the anode diffusion layer 17, which was cut to a size of 6 cm×6 cm, was laminated on the anode catalyst layer of the CCM in such a manner that its water-repellent carbon layer was positioned inward. Likewise, the cathode diffusion layer 19, which was cut to a size of 6 cm×6 cm, was laminated on the cathode catalyst layer in such a manner that its water-repellent carbon layer was positioned inward. The catalyst layers and the diffusion layers were then bonded together by hot pressing (130° C., 4 MPa, 3 minutes). In this way, the anode 11 and the cathode 12 were formed on both sides of the electrolyte membrane 10.

The anode diffusion layer 17 was composed of a carbon paper (TGP-H090 available from Toray Industries Inc.) and a water-repellent carbon layer (PTFE content: 40% by weight, thickness: approximately 30 μm) carried on one face of the carbon paper. The cathode diffusion layer 19 used was a carbon cloth (LT2500W available from E-TEK). The carbon layer contained furnace black (Vulcan XC-72 available from Cabot Corporation) as the carbon material.

Further, the gaskets 21 and 22 were thermally bonded (130° C., 4 MPa, 5 minutes) to the electrolyte membrane 10 around the anode 11 and the cathode 12, respectively, so as to sandwich the electrolyte membrane 10, in order to produce the MEA 1. The gasket used was a three-layer laminate composed of a silicone rubber layer, a polyetherimide layer, and a silicone rubber layer.

The MEA 1 was sandwiched between the separators 14 and 15, current collector plates 24 and 25, sheet heaters (Semicon heater available from SAKAGUCHI E.H. VOC CORP.) 26 and 27, insulator plates 28 and 29, and end plates 30 and 31, all of which had outer dimensions of 10 cm×10 cm. The resultant combination was secured with clamping rods. The clamping pressure was set to 20 kgf per square centimeter of the area of the separator.

The separators 14 and 15 were prepared from a resin-impregnated graphite material of 4 mm in thickness (G347B available from TOKAI CARBON CO., LTD.), and had serpentine flow channels 20 and 21, respectively, with a width of 1.5 mm and a depth of 1 mm. The current collector plates 24 and 25 used were gold-plated stainless steel plates.

The fuel cell produced in the above manner was designated as a fuel cell A.

Example 2

The weight ratio of the catalyst particles to the polymer electrolyte in the anode catalyst ink was set to 3:1, and the weight ratio of the catalyst particles to the polymer electrolyte in the cathode catalyst ink was set to 3:1. In forming the high-porosity regions 56 of the anode catalyst layer, the pressure of the nitrogen gas for spraying the first catalyst ink 41 was set to 0.07 MPa. In forming the high-porosity regions 56' of the cathode catalyst layer, the pressure of the nitrogen gas for spraying the first catalyst ink 41' was set to 0.07 MPa. In forming the catalyst layer, the surface temperature of the substrate 54 was set to 60° C. Except for these, in the same manner as in Example 1, a fuel cell B was produced. The dried anode catalyst layer 16 had a thickness of approximately 120 μm and a Pt—Ru catalyst content of 5.4 mg/cm$^2$. The dried cathode catalyst layer 18 had a thickness of approximately 73 μm and a Pt catalyst content of 1.0 mg/cm$^2$.

Example 3

The weight ratio of the catalyst particles to the polymer electrolyte in the anode catalyst ink was set to 3:1, and the weight ratio of the catalyst particles to the polymer electrolyte in the cathode catalyst ink was set to 3:1. In forming the high-porosity regions 56 of the anode catalyst layer, the pressure of the nitrogen gas for spraying the first catalyst ink 41 was set to 0.12 MPa. In forming the high-porosity regions 56' of the cathode catalyst layer, the pressure of the nitrogen gas for spraying the first catalyst ink 41' was set to 0.12 MPa. In forming the catalyst layer, the surface temperature of the substrate 54 was set to 50° C. Except for these, in the same manner as in Example 1, a fuel cell C was produced. The dried anode catalyst layer 16 had a thickness of approximately 58 μm and a Pt—Ru catalyst content of 6.4 mg/cm$^2$. The dried cathode catalyst layer 18 had a thickness of approximately 45 μm and a Pt catalyst content of 1.3 mg/cm$^2$.

Example 4

A fuel cell D was produced in the same manner as in Example 1 except that the cathode catalyst layer 18 had a uniform structure composed only of the low-porosity region 57', i.e., the cathode catalyst layer 18 was formed from only the second catalyst ink 48' by spraying coating. The dried cathode catalyst layer 18 had a thickness of approximately 41 μm and a Pt catalyst content of 1.3 mg/cm$^2$.

Example 5

A fuel cell E was produced in the same manner as in Example 1 except that the anode catalyst layer 16 had a uniform structure composed only of the low-porosity region 57, i.e., the anode catalyst layer 16 was formed from only the second catalyst ink 48 by spraying coating. The dried anode catalyst layer 16 had a thickness of approximately 75 μm and a Pt—Ru catalyst content of 6.3 mg/cm$^2$.

Example 6

The weight ratio of the catalyst particles to the polymer electrolyte in the anode catalyst ink was set to 3:1. In forming the high-porosity regions 56, the pressure of the nitrogen gas for spraying the first catalyst ink 41 was set to 0.05 MPa. In forming the anode catalyst layer, the surface temperature of the substrate 54 was set to 65° C. Except for these, in the same manner as in Example 4, a fuel cell F was produced. The dried anode catalyst layer 16 had a thickness of approximately 144 μm and a Pt—Ru catalyst content of 5.6 mg/cm$^2$. The dried cathode catalyst layer 18 had a thickness of approximately 41 μm and a Pt catalyst content of 1.3 mg/cm$^2$.

Example 7

The weight ratio of the catalyst particles to the polymer electrolyte in the cathode catalyst ink was set to 2:1. In forming the low-porosity regions 57', the pressure of the nitrogen gas for spraying the second catalyst ink 48' was set to 0.30 MPa. In forming the cathode catalyst layer, the surface temperature of the substrate 54 was set to 45° C. Except for these, in the same manner as in Example 5, a fuel cell G was produced. The dried anode catalyst layer 16 had a thickness of approximately 75 μm and a Pt—Ru catalyst content of 6.3 mg/cm$^2$. The dried cathode catalyst layer 18 had a thickness of approximately 47 μm and a Pt catalyst content of 1.0 mg/cm$^2$.

Comparative Example 1

The anode catalyst layer 16 had a uniform structure composed only of the low-porosity region 57, i.e., the anode catalyst layer 16 was formed from only the second catalyst ink 48 by spraying coating. The cathode catalyst layer 18 had a uniform structure composed only of the low-porosity region 57', i.e., the cathode catalyst layer 18 was formed from only the second catalyst ink 48' by spraying coating. Except for these, in the same manner as in Example 1, a fuel cell 1 was produced. The dried anode catalyst layer 16 had a thickness of approximately 75 μm and a Pt—Ru catalyst content of 6.3 mg/cm$^2$. The dried cathode catalyst layer 18 had a thickness of approximately 41 μm and a Pt catalyst content of 1.3 mg/cm$^2$.

Comparative Example 2

The weight ratio of the catalyst particles to the polymer electrolyte in the anode catalyst ink was set to 3:1. The anode catalyst layer 16 had a uniform structure composed only of the high-porosity region, i.e., the anode catalyst layer 16 was formed from only the first catalyst ink 41 by spray coating. The pressure of the nitrogen gas for spraying the first catalyst ink 41 was set to 0.08 MPa.

The weight ratio of the catalyst particles to the polymer electrolyte in the cathode catalyst ink was set to 2:1. The cathode catalyst layer 18 had a uniform structure composed only of the high-porosity region, i.e., the cathode catalyst layer 18 was formed from only the first catalyst ink 41' by spray coating. The pressure of the nitrogen gas for spraying the first catalyst ink 41' was set to 0.18 MPa.

Except for these, in the same manner as in Example 1, a fuel cell 2 was produced. The dried anode catalyst layer 16 had a thickness of approximately 164 μm and a Pt—Ru catalyst content of 5.7 mg/cm$^2$. The dried cathode catalyst layer 18 had a thickness of approximately 98 μm and a Pt catalyst content of 1.1 mg/cm$^2$.

The porosities of the high-porosity regions (region 1) and the low-porosity regions (region 2) in the anode and cathode catalyst layers of the fuel cells of Examples 1 to 7 and Comparative Examples 1 to 2 were measured as follows. A layer composed only of a high-porosity region and a layer composed only of a low-porosity region were prepared by reapplying the catalyst ink 32 times in the same manner as in the preparation of the respective regions. The pore distribution of each layer was measured by mercury intrusion, and from the resultant data, the porosity of each layer was determined. The results are shown in Table 1, together with the amount of catalyst and thickness for each catalyst layer. The amount of catalyst was obtained by dividing the catalyst amount contained in the catalyst layer by the projected area (6 cm×6 cm) of the catalyst layer.

TABLE 1

|  | Anode catalyst layer | | | | Cathode catalyst layer | | | |
| --- | --- | --- | --- | --- | --- | --- | --- | --- |
|  | Amount of Pt—Ru catalyst (mg/cm$^2$) | Thickness (μm) | Porosity of region 1 (%) | Porosity of region 2 (%) | Amount of Pt catalyst (mg/cm$^2$) | Thickness (μm) | Porosity of region 1 (%) | Porosity of region 2 (%) |
| Fuel cell A | 5.6 | 105 | 90.6 | 73.5 | 1.3 | 65 | 88.9 | 71.6 |
| Fuel cell B | 5.4 | 120 | 94.7 | 84.6 | 1.0 | 73 | 94.7 | 84.6 |
| Fuel cell C | 6.4 | 58 | 86.9 | 65.8 | 1.3 | 45 | 86.6 | 65.8 |
| Fuel cell D | 5.6 | 105 | 90.6 | 73.5 | 1.3 | 41 | — | 71.6 |
| Fuel cell E | 6.3 | 75 | — | 73.5 | 1.3 | 65 | 88.9 | 71.6 |
| Fuel cell F | 5.6 | 144 | 96.2 | 80.9 | 1.3 | 41 | — | 71.6 |
| Fuel cell G | 6.3 | 75 | — | 73.5 | 1.0 | 47 | 92.5 | 62.6 |
| Fuel cell 1 | 6.3 | 75 | — | 73.5 | 1.3 | 41 | — | 71.6 |
| Fuel cell 2 | 5.7 | 164 | 92.0 | — | 1.1 | 98 | 91.0 | — |

Next, the fuel cells A to G produced in Examples 1 to 7 and the fuel cells 1 to 2 produced in Comparative Examples 1 to 2 were evaluated for their anode overvoltage characteristic, cathode overvoltage characteristic, and durability. The evaluation methods are described below. The results are shown in Table 2.

[Evaluation]

(1) Anode Overvoltage Characteristic

The anode terminal of each fuel cell was connected to the plus terminal of a power source, and the cathode terminal was connected to the minus terminal of the power source. With a 4M methanol aqueous solution supplied to the anode at a flow rate of 0.2 cc/min and hydrogen supplied to the cathode at a flow rate of 0.16 L/min, the fuel cell was operated at a cell temperature of 60° C. and a current density of 150 mA/cm$^2$ for 5 minutes. At this time, the cathode potential relative to the anode potential was measured. From the measured data, voltage increase due to internal resistance was subtracted, and the obtained value was used as the anode overvoltage characteristic value.

(2) Cathode Overvoltage Characteristic

With hydrogen supplied to the anode at a flow rate of 0.16 L/min and air supplied to the cathode at a flow rate of 0.2 L/min, each fuel cell was operated to generate power at a cell temperature of 60° C. and a current density of 150 mA/cm$^2$ for 5 minutes. At this time, the effective voltage was measured. From the electromotive force of 1.23 V of a solid polymer electrolyte fuel cell (PEFC), the measured effective voltage and voltage drop due to internal resistance were subtracted, and the obtained value was used as the cathode overvoltage characteristic value.

(3) Durability

With a 4M methanol aqueous solution supplied to the anode at a flow rate of 0.2 cc/min and air supplied to the cathode at a flow rate of 0.2 L/min, each fuel cell was operated to generate power at a cell temperature of 60° C. and a current density of 150 mA/cm$^2$ for 4 hours. At this time, the effective voltage was measured, and this was used as the initial voltage. Thereafter, the fuel cell was continuously operated to generate power for 1000 hours and the voltage was measured. The ratio of the voltage after the 1000-hour continuous power generation to the initial voltage (voltage retention rate) was calculated. In this evaluation, the amount of fuel supply was set to 1.4 times the amount of fuel consumption due to power generation, and the amount of air supply was set to 2.0 times the amount of air consumption due to power generation. In Table 2, the voltage retention rate is expressed as a percentage.

TABLE 2

| | Anode overvoltage characteristic value (V) | Cathode overvoltage characteristic value (V) | Durability | |
|---|---|---|---|---|
| | | | Initial voltage (V) | Voltage retention rate (%) |
| Fuel cell A | 0.322 | 0.398 | 0.464 | 98 |
| Fuel cell B | 0.327 | 0.406 | 0.453 | 96 |
| Fuel cell C | 0.311 | 0.412 | 0.472 | 95 |
| Fuel cell D | 0.322 | 0.427 | 0.437 | 86 |
| Fuel cell E | 0.341 | 0.398 | 0.428 | 92 |
| Fuel cell F | 0.331 | 0.427 | 0.418 | 74 |
| Fuel cell G | 0.341 | 0.419 | 0.424 | 83 |
| Fuel cell 1 | 0.341 | 0.427 | 0.402 | 58 |
| Fuel cell 2 | 0.353 | 0.436 | 0.388 | 62 |

As is clear from Table 2, in the fuel cells A to D, the anode overvoltage of the anode catalyst layer was small. This is probably because regions having paths that are excellent in fuel diffusion and carbon dioxide (reaction product) removal (high-porosity regions) and regions having good electron and proton conductivity (low-porosity regions) are three-dimensionally mixed in the anode catalyst layer and thus the three-phase interface serving as the electrode reaction site was enlarged.

Further, in the fuel cells A to C and E, the cathode overvoltage of the cathode catalyst layer was small. This is probably because regions having paths that are excellent in air diffusion and water removal (high-porosity regions) and regions having good electron and proton conductivity (low-porosity regions) are three-dimensionally mixed in the cathode catalyst layer and hence the three-phase interface serving as the electrode reaction site was enlarged.

Among these fuel cells, the fuel cells A to C exhibited significantly improved durability. In the case of these fuel cells, in both the anode catalyst layer and the cathode catalyst layer, units each composed of a high-porosity region and a low-porosity region are regularly arranged in the thickness direction of the catalyst layer and the direction perpendicular to the thickness direction, and the porosities of the respective regions are adjusted in the appropriate ranges. Probably for this reason, the evenness of electrode reaction in the whole area of the catalyst layer could be enhanced and the durability could be dramatically improved.

The fuel cell F exhibited slightly lower power generating characteristics than the fuel cell D. In the case of the fuel cell F, the porosity of the high-porosity regions of the anode catalyst layer is beyond the appropriate range. Probably for this reason, the electron and proton conductivity lowered slightly, thereby resulting in the slight decline in power generating characteristics.

The fuel cell G exhibited slightly poor durability compared with the fuel cell E. In the case of the fuel cell G, the porosity of the low-porosity regions of the cathode catalyst layer is less than the appropriate range. Probably for this reason, air diffusion or water removal were slightly impaired, thereby resulting in the slightly poor durability.

On the other hand, in the case of the fuel cell 1 of a comparative example, the anode catalyst layer and the cathode catalyst layer have a uniform structure composed only of a low-porosity region. Probably for this reason, fuel diffusion and carbon dioxide (reaction product) removal in the anode catalyst layer and air diffusion and water (reaction product) removal in the cathode catalyst layer were impaired, so that both anode overvoltage and cathode overvoltage increased, thereby resulting in a significant degradation of power generating characteristics.

In the case of the fuel cell 2 of a comparative example, the anode catalyst layer and the cathode catalyst layer have a uniform structure composed only of a high-porosity region. Probably for this reason, electron and proton conductivity in the catalyst layer lowered, so that both anode overvoltage and cathode overvoltage increased, thereby leading to a significant degradation of power generating characteristics.

It should be noted that the fuel cells F and G have slightly poor power generating characteristics compared with the fuel cells D and E, but are significantly improved in initial voltage and voltage retention rate compared with the fuel cells 1 and 2. This shows that even the fuel cells F and G can produce the effects of the invention.

The direct oxidation fuel cell of the invention is excellent in power generating characteristics and durability, thus being useful, for example, as the power source for portable small-sized electronics such as cellular phones, notebook personal computers, and digital still cameras. Further, the direct oxidation fuel cell of the invention is applicable to electric scooters, automobile power sources, etc.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A direct oxidation fuel cell comprising at least one unit cell, said unit cell including:
   an electrolyte membrane;
   an anode laminated on a first surface of said electrolyte membrane;
   a cathode laminated on a second surface of said electrolyte membrane;
   an anode-side separator having a fuel flow channel and facing said anode; and
   a cathode-side separator having an oxidant flow channel and facing said cathode,
   wherein said anode includes an anode-side catalyst layer, and an anode-side conductive porous substrate laminated on said anode-side catalyst layer,
   said cathode includes a cathode-side catalyst layer, and a cathode-side conductive porous substrate laminated on said cathode-side catalyst layer,
   at least one of said anode-side catalyst layer and said cathode-side catalyst layer is a catalyst layer laminate comprising 10 to 32 layers of unit catalyst layers laminated in the thickness direction thereof, said unit catalyst layers containing a conductive carbon particle carrying a catalyst metal particle, and a polymer electrolyte,
   said unit catalyst layers each include a plurality of first regions having a high porosity, and a plurality of second regions having a low porosity, said first regions and said second regions being arranged alternately,
   the difference between the porosity of said first region and the porosity of said second region is equal to or greater than 10%,
   said catalyst layer laminate includes: a surface at said electrolyte membrane side, and a surface facing said surface at said electrode membrane side, and
   said first regions and said second regions partially overlap each other in the thickness direction of said catalyst layer laminate, the overlapped parts being arranged continuously slantwise in the thickness direction of said catalyst layer laminate, starting from said surface at said electrode membrane side until reaching said surface facing said surface at said electrode membrane side.

2. A direct oxidation fuel cell comprising at least one unit cell, said unit cell including:
   an electrolyte membrane;
   an anode laminated on a first surface of said electrolyte membrane;
   a cathode laminated on a second surface of said electrolyte membrane;
   an anode-side separator having a fuel flow channel and facing said anode; and
   a cathode-side separator having an oxidant flow channel and facing said cathode,
   wherein said anode includes an anode-side catalyst layer, and an anode-side conductive porous substrate laminated on said anode-side catalyst layer,
   said cathode includes a cathode-side catalyst layer, and a cathode-side conductive porous substrate laminated on said cathode-side catalyst layer,
   at least one of said anode-side catalyst layer and said cathode-side catalyst layer is a catalyst layer laminate comprising 10 to 32 layers of unit catalyst layers laminated in the thickness direction thereof, said unit catalyst layers containing a conductive carbon particle carrying a catalyst metal particle, and a polymer electrolyte,
   said unit catalyst layers each include a plurality of first regions having a porosity of 86 to 95%, and a plurality of second regions having a porosity of 65 to 85%, said first regions and said second regions being arranged alternately,
   said catalyst layer laminate includes: a surface at said electrolyte membrane side, and a surface facing said surface at said electrode membrane side, and
   said first regions and said second regions partially overlap each other in the thickness direction of said catalyst layer laminate, the overlapped parts being arranged continuously slantwise in the thickness direction of said catalyst layer laminate, starting from said surface at said electrode membrane side until reaching said surface facing said surface at said electrode membrane side.

3. the direct oxidation fuel cell in accordance with claim 2, wherein the difference between the porosity of said first region and the porosity of said second region is equal to or greater than 10%.

* * * * *